United States Patent [19]

Maussion

[11] 4,247,760
[45] Jan. 27, 1981

[54] METHOD AND CIRCUIT ARRANGEMENT FOR GENERATING AND PROCESSING TWO SEPARATE PULSE TRAINS BEARING INFORMATION

[75] Inventor: Daniel Maussion, Angers, France

[73] Assignee: Compagnie Internationale pour l'Informatique, Paris, France

[21] Appl. No.: 92,561

[22] Filed: Nov. 8, 1979

[30] Foreign Application Priority Data

Nov. 22, 1978 [FR] France ............................. 78 32934

[51] Int. Cl.³ .......................... G06K 7/08; G06K 7/14
[52] U.S. Cl. .................................... 235/449; 235/463; 340/146.3 Z
[58] Field of Search ...................... 235/449, 450, 463; 340/146.3 Z, 146.3 C; 360/40

[56] References Cited

U.S. PATENT DOCUMENTS

| | | | |
|---|---|---|---|
| Re. 26,744 | 12/1969 | Perotto | 340/146.3 Z |
| 3,309,667 | 3/1967 | Feissel et al. | 340/146.3 Z |
| 3,766,364 | 10/1973 | Krecioch et al. | 340/146.3 Z |
| 3,882,464 | 5/1975 | Zamkow | 340/146.3 Z |
| 4,053,737 | 10/1977 | Lafevers et al. | 235/449 |

Primary Examiner—Daryl W. Cook
Attorney, Agent, or Firm—Kerkam, Stowell, Kondracki & Clarke

[57] ABSTRACT

A system for generating and processing pulses representing information, from two pseudoperiodic analog signals along two interconnected channels. Each pseudoperiodic signal is generated by a separate magnetoresistor and is converted in an associated channel into two series of pulses. Conversion is effected by means of threshold switching circuits which control the operation of a bistable flip-flop via a combining circuit. The output of the bistable flip-flop in each channel is cross-connected to one input of a combining circuit in the other channel, the other input of which is a low threshold signal corresponding to the pseudoperiodic signal fed to that channel. The gate produces the logic product of its inputs which drives a flip-flop. The output of the flip-flop is terminated by a reset pulse derived from a zero reset stage.

5 Claims, 2 Drawing Figures

METHOD AND CIRCUIT ARRANGEMENT FOR GENERATING AND PROCESSING TWO SEPARATE PULSE TRAINS BEARING INFORMATION

BACKGROUND OF THE INVENTION

1. Field of the Invention

The invention relates to a method and circuit arrangement for generating and processing pulses which are then transmitted along two separate channels, with the object of extracting information from the pulse trains by applying rules for comparision and/or coincidence. The object of the invention is to increase the length of certain pulses under certain conditions which are considered as being significant, in order to make the application of the rules for comparision and/or coincidence mentioned above more reliable, and thus to reduce the likelihood of errors in the information extracted.

2. Description of the Prior Art

In digital logic systems, it may be necessary to compare the phases of two separate pulse trains in order to extract information from them. This information may be coded to a greater or lesser degree in the two pulse trains by the "temporal overlap" between certain pulses, that is to say the coincidence in time between at least part of a pulse belonging to a first train with some portion of a pulse belonging to the second train.

The problem which is most difficult to solve with systems of this kind arises from the fact that the pulses are not always of a sufficiently long duration, which makes the significant "temporal overlap" a somewhat haphazard affair.

An example which may be cited is that of a system for reading information which has been transcribed into the CMC7 code using magnetizable ink. A system of this nature has been amply described in copending application Ser. No. 069,251, corresponding to French Application No. 78.29848, assigned to the assignee of the present invention.

Briefly, it can be stated that when a document (such as a check for example) bears information which is coded in CMC7 code by magnetized bars which are separated from one another by long intervals or short intervals, the reading is performed by a double magnetic head incorporating two magnetoresistors which are separated from one another by a pedetermined distance. Since the information is represented by the number of short and long intervals and the order in which they succeed one another, what is analyzed to detect the passage of a long or short interval in front of the double magnetic head during the relative reading movement between the head and the document is the "temporal overlap" between pulses belonging to two separate pulse trains generated by the two magnetoresistors. If the magnetoresistor which is arranged to be the first to read the magnetized bars during the said relative movement is called the first magnetoresistor and if the magnetoresistor which is arranged to read the same information, but second in order of succession is called the second magnetoresistor, the following rule can be stated for identifying the two kinds of interval, one long and one short:

a long interval is detected when the rising edge of a pulse generated by the first magnetoresistor is recorded while a pulse generated by the second magnetoresistor is present;

a short interval is detected when the falling edge of a pulse generated by the first magnetoresistor is recorded while a pulse generated by the second magnetoresistor is present.

Thus, it will be appreciated that identification errors may occur if one of the pulses (or both) happens to be of too short a duration to produce the above-mentioned "temporal overlap" which is what determines the detection of a rising or falling edge.

Now, a given pulse coming from one or the other of the magnetoresistors may be of very short duration due to the fact that it depends on the method of analog/digital conversion employed. This conversion is in fact performed by threshold switching circuits which are connected between each magneto-resistor and the rest of the system. The principle and the method of operation of threshold switching circuits of this kind are fully described in the above-mentioned prior patent application, the subject matter of which is hereby incorporated by reference. It may, however, be mentioned that, for a given threshold, the pulses produced by the threshold detection circuit are shorter as the amplitude of the analog signal is lower. Conversely, for the same level of analog signal, the higher the threshold the shorter the resulting pulses. Finally, it should not be overlooked that the lower the threshold the more sensitive is the corresponding switching circuit to spurious information (such as the presence of spots of magnetizable ink on the document, etc.)

SUMMARY OF THE INVENTION

The invention provides a solution to this dilemma in that a choice is at all times made between the two possible threshold values by accepting the signals supplied by the low-threshold switching circuit (which supplies the pulses of longer duration) only when it is certain that these signals are significant.

To be more exact, the invention relates to a method of generating and processing pulses representing information, the said pulses being generated by two separate sources of pseudoperiodic analog signals which are transmitted along two digital processing channels with a view to applying rules for comparision and/or coincidence between the pulses on the two channels and with a view to producing the said information therefrom. The pulses on each channel are derived from a respective one of the said analog signals and are generated by switching between two voltage levels. The switching operations are controlled by the sign of the difference between the instantaneous value of each significant half-cycle of the said analog signal and a predetermined threshold.

The invention encompasses the improvement wherein two separate series of pulses are generated from each analog signal by controlling the relevant switching operations with reference to two different predetermined thresholds, which are respectively a high threshold and a low threshold. Each pulse in the series associated with the low threshold is generated before the analogous pulse in the series associated with the high threshold and persists after the analogous pulse has disappeared. Further, on each channel, one pulse is generated for each pair of pulses in the said two series during a period of time which begins either with the leading edge of the pulse belonging to the said pair which is associated with the low threshold, if the said edge is generated while a pulse is present on the other channel, or with the leading edge of the pulse belonging to the said pair which is associated with the high threshold in the opposite case, and in all cases terminating with the trailing edge of the pulse in the said pair which is associated with the low threshold.

In cases where the CMC7 code is read by magnetoresistors, the significant half-cycles of the analog signals are those which correspond to the single central half-cycle in each individual response to each magnetized bar.

The invention also relates to a circuit arrangement for generating and processing pulses representing information. The arrangement comprises two inputs connected to two separate sources of pseudoperiodic analog signals and two outputs which are intended to be connected to two digital processing channels which are designed to apply rules for comparison and/or coincidence between the pulses which are transmitted along the two channels and to deduce the said information therefrom. The improvement comprises having each input connected to two threshold switching circuits which are set to a high threshold and a low threshold, respectively. The output of the low threshold switching circuit is connected to a first input of a two-input AND or NAND gate belonging to a combining circuit. An output of this combining circuit is connected to at least one driving input of a first bistable flip-flop means. The output of the first flip-flop means is connected to one of the two said outputs which are intended to be connected to the said digital processing channels, while the other of the two outputs is connected to the second input of the said two input gate. The output of the high threshold switching circuit is connected to another input, such as the clock input for example, of the bistable flip-flop means.

The other input of the arrangement likewise is connected to two other threshold switching circuits which are connected to another combining circuit and to a second bistable flip-flop means interconnected in a fashion similar to the first flip-flop means, i.e., the output is cross coupled to an input of a gate on the combining circuit for the signal applied to the first input.

BRIEF DESCRIPTION OF THE DRAWINGS

The invention will be better understood, along with its objects, details and advantages, which will become more clear from the following explanatory description which is given solely by way of example with reference to the accompanying nonlimiting drawings, in which.

DETAILED DESCRIPTION OF THE PREFERRED EMBODIMENTS

Figure 1:
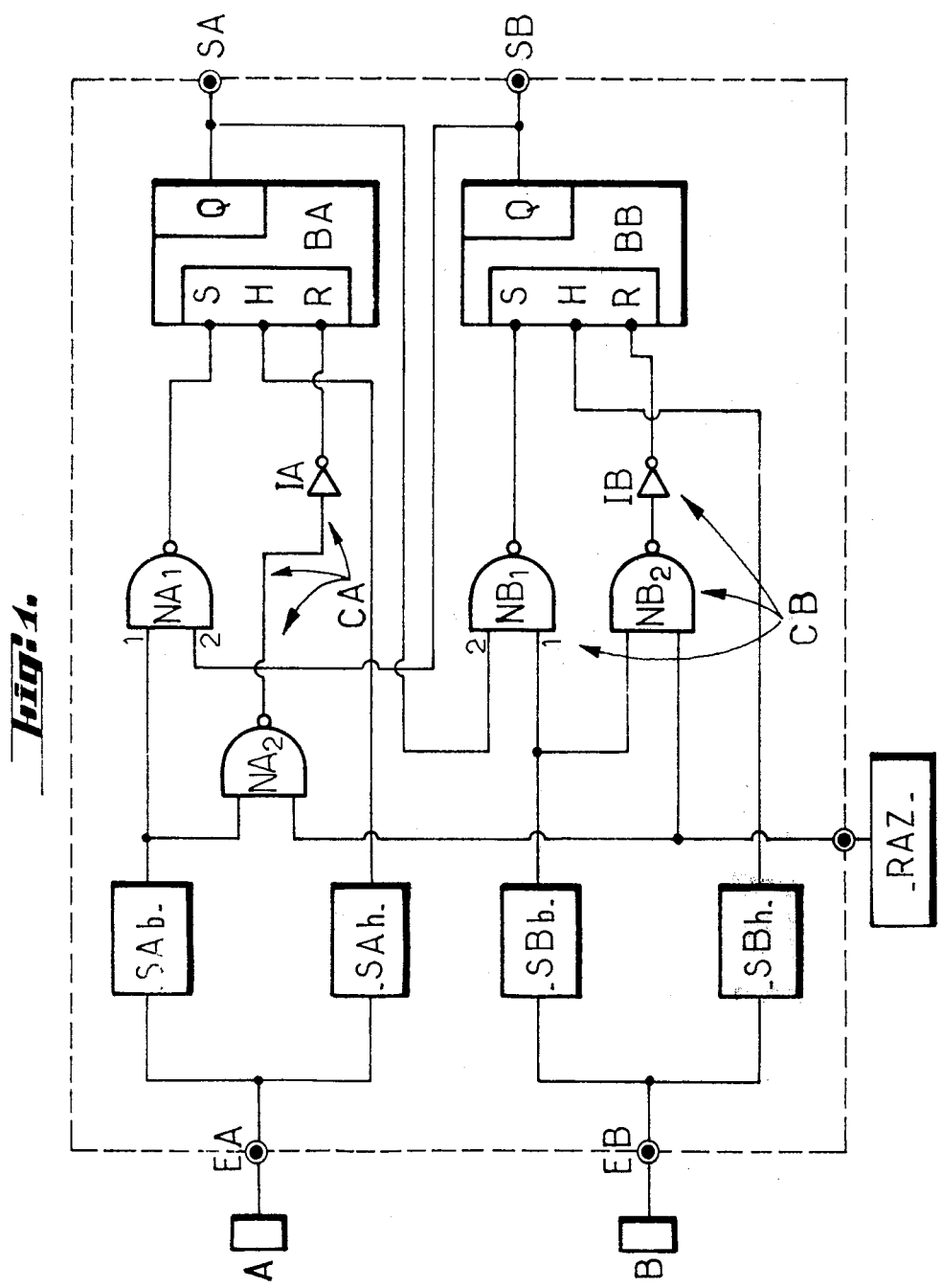
FIG. 1 is a diagram of an electronic circuit arrangement for putting into practice a method according to the invention.

Referring to FIG. 1, a circuit arrangement according to the present invention has two inputs EA and EB, and two outputs SA and SB. Inputs EA and EB are connected to respective ones of the analog signal sources which are formed in the present case by two magnetoresistors represented diagramatically by blocks A and B. As is well known, magnetoresistors A and B are provided with means, not shown, for supplying them with DC current. Magnetoresistors A and B are separated by a certain distance and are arranged in a system which enables relative movement to be produced between the two magnetoresistors and a document, such as a check, bearing information code in CMC7 code using magnetic ink.

Outputs SA and SB are intended to be connected to two digital processing channels which are designed to apply rules for comparison and/or coincidence between the pulses which are transmitted from outputs SA and SB and to obtain the decoded information in this way. Thus, in a case where the application is to a system for reading characters coded in CMC7 code, the two processing channels are arranged to apply the rule for identifying the two kinds of interval which are set forth above.

The circuit arrangement of the present invention comprises four threshold switching circuits, two for each channel. Two are set to a low threshold and two are set to a high threshold, but each channel includes one low threshold circuit and one high threshold circuit. Each input is connected to two adjustable threshold switching circuits of a channel on a high threshold and on a low threshold, respectively. Thus, input EA of the arrangement is connected to the inputs of a switching circuit SAb (low threshold) and a switching circuit SAh (high threshold). Input EB is connectd to the inputs of a switching circuit SBb (low threshold) and a switching circuit SBh (high threshold). The two circuits SAb and SAh control a first bistable flip-flop BA via a combining circuit CA comprising a first NAND gate NA1, a second NAND gate NA2 and an inverter IA. Similarly, the two circuits SBb and SBh control a second bistable flip-flop BB via a combining circuit CB comprising a first NAND gate NB1, a second NAND gate NB2 and an inverter IB. Thus it can be seen that the circuit arrangement of each channel is identical but for the cross coupling of the output of flip-flop BA to gate NB1 and of flip-flop BB to gate NA1.

Flip-flops BA and BB are shown with their inputs and outputs in standard form (R,S,H,Q). Outputs SA and SB coincide with the respective Q outputs of flip-flops BA and BB. The first gates NA1, NB1 in each combining circuit each have two inputs of which the first input (1) is connected to the output of the corresponding low-threshold switching circuits, that is to say SAb, SBb respectively, and of which the second input (2) is connected to the other output of the circuit arrangement as hereinbefore described, i.e., that output which does not correspond to the bistable flip-flop controlled by the combining circuit to which the NAND gate belongs. Thus, the second input of the gate NA1 is connected to output SB and the said second input of gate NB1 is connected to output SA.

The gate NA1 (or NB1) is the principal component of the combining circuit CA (or CB). In the example shown, it is a NAND gate, but the circuit could be produced from simple AND gates, the object being to produce at least the logic products SAb. SB and SBb. SA, or their inverse in the example being described. The output of gate NA1, which also forms one output of combining circuit CA, is connected to a first driving input S of flip-flop BA. The output of gate NB1 is connected to a first driving input S of flip-flop BB. The output of threshold circuit SAh is connected to the clock input H of flip-flop BA and the output of threshold circuit SBh is connected to the clock input H of flip-flop BB.

Gates NA2 and NB2 likewise each have two inputs. A first input of gate NA2 is connected to the output of switching circuits SAb and a first input of gate NB2 is connected to the output of switching circuit SBb. The second input of gate NA2 and the second input of gate NB2 are both connected to a pulse source RAZ of zero reset pulses. These pulses correspond for example to one period for reading the document.

The output of gate NA2 is connected to a second driving input R of flip-flop BA, via inverter IA, while the output of gate NB2 is connected to a second driving input R of flip-flop BB via inverter IB. As should be apparent from the standard reference letters R and S which are used to identify the inputs of flip-flops BA and BB, the said first driving inputs are the positioning or set inputs while the said second driving inputs are the resetting inuts. The H input is the clock input.

Figure 2:
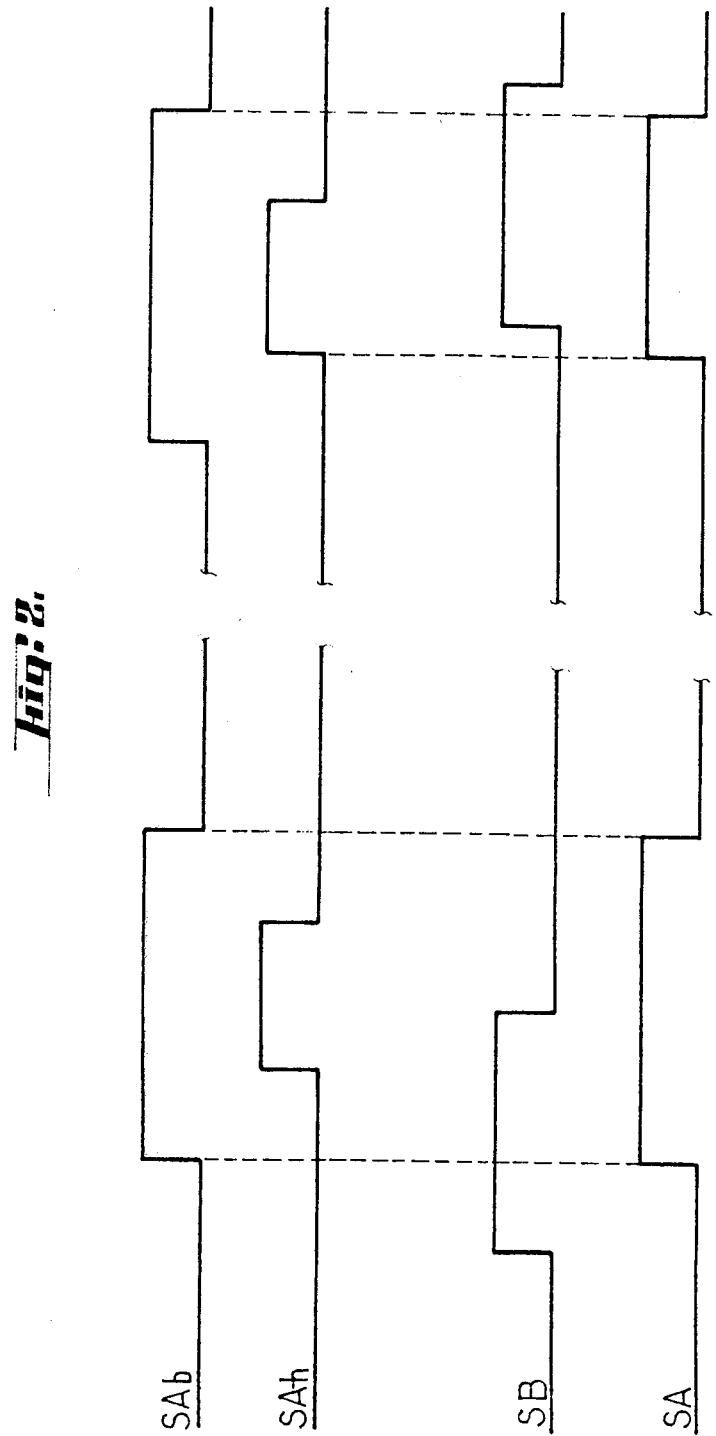
FIG. 2 is a diagram with reference to time which illustrates both the method set forth above and the operation of the arrangement of FIG. 1.

FIG. 2 illustrates with respect to time the operation of the section of the arrangement shown in FIG. 1 whose function is to process the pseudoperiodic analog signal generated by magnetoresistor A, that is to say the sub-assembly in one channel comprising the two switching circuits SAb and SAh, the combining circuit CA and flip-flop BA. The sub-assembly formed in the other channel by circuits SAb, and SBh, circuit CB and flip-flop BB will process the pseudoperiodic signal generated by magnetoresistor B in a similar fashion.

For each significant half-cycle of the pseudoperiodic signal generated by magnetoresistor A, circuits SAb and SAh generate respective steep-sided pulses as shown in FIG. 2. As indicated above, these pulses are generated by switching between two voltage levels, these switching operations being controlled by the sign of the difference between the instantaneous value of the analog signal and the predetermined threshold (low or high). In this way, two separate series of pulses are generated from the same analog signal coming from magnetoresistor A. A result of the manner of operation of a threshold switching circuit as described above, will obviously be that each pulse in the series which associates with the low threshold (SAb in FIG. 2) will be triggered before analog pulse (SAh) in the series associated with the high threshold appears and will persist after the latter has ceased. With these two pulses there are two possible eventualities illustrated by the left and right hand parts respectively of the diagram with respect to time in FIG. 2.

First eventuality: If the pulse transmitted from output SB is already at the moment of appearance of the leading edge (that is to say the edge which appears first in time) of the pulse from circuit SAb, the pulse generated through output SA will begin at the same time as the said leading edge and will end at the same time as the trailing edge of this same pulse, coming from circuit SAb.

Second eventuality: If the pulse transmitted to output SB is not present at the moment when the leading edge of the pulse coming from circuit SAb appears, the pulse generated at output SA will begin at the same time as the leading edge of the pulse coming from circuit SAh and will end at the same time as the trailing edge of the pulse coming from the circuit SAb.

It is in fact this operation which is effected by the arrangement in FIG. 1. Gate NA1 produces the logic product $\overline{SAb.SB}$ and triggers flip-flop BA when the conditions relating to the first eventuality above prevail. The cessation of the pulse at the output of circuit SAb reverse the logic levels of the driving input S and R and returns flip-flop BA to its previous logic state. Conversely, if flip-flop BA is not triggered by the condition $\overline{SAb.SB}$, it will be triggered a little later by the leading edge of the pulse from circuit SAh which is applied to the clock input H of flip-flop BA. It should be mentioned that the pulse from flip-flop SB which is shown in the diagram 2 is itself a pulse which has been subjected to similar processing by switching circuits SBb, SBh, of combining circit CB and flip-flop BB.

The invenion is not of course in any way restrictive of the embodiment which has just been described and it covers all technically equivalents of the means employed if they are so employed within the true spirit and scope of the invention defined in the following claims.

I claim:

1. A method for generating and processing pulses representing information comprising applying two separate pseudoperiodic analog signals each to a digital processing channel for the purpose of applying rules for comparision and/or coincidence between first and second pulses derived from each said analog signal, deriving said first and said second pulses along each channel, from respective ones of said analog signals, said first and said second pulses being generated by switching between two voltage levels, controlling the relevant switching operations with reference to two different predetermined threshold levels represented by a high threshold and a low threshold, respectively, the switching operation being controlled by the sign of the difference between the instantaneous value of each significant half-cycle of the said analog signal and a predetermined threshold such that two separate series of pulses are generated from each analog signal, generating each pulse in the series associated with the low threshold before the analogous pulse in the series associated with the high threshold and for a period which extends after the said analogous signal has ceased, and generating on each channel one pulse for each pair of pulses belonging to the said two series during a period of time which begins with the leading edge of that pulse belonging to the said pair which associated with the low threshold when the said edge is generated while a pulse is present on the other channel, or with the leading edge of that pulse belonging to the said pair which is associated with the high threshold in the opposite case, and in all cases which terminates with the trailing edge of the pulse in the said pair which is associated with the low threshold.

2. The method according to claim 1, wherein each pulse on each channel is generated by storing a voltage level during the said period of time.

3. In a circuit arrangement for generating and processing pulses representing information, said circuit arrangement having two inputs connected to two separate sources of pseudoperiodic analog signals and two outputs adapted to be connected to two digital processing channels to apply rules for comparison and/or coincidence between the pulses which are transmitted along two channels, the improvement comprising two threshold switching circuits for each channel, means connecting one of the inputs to a corresponding one of said two threshold switching circuits of one channel and the other of said inputs to a corresponding one of said two threshold switching circuits of the other channel, each of said threshold switching circuits for each channel including a high threshold circuit and a low threshold circuit, the output of the low threshold switching circuit for each channel being connected to a first input of a combining circuit in said channel, said combining circuit having two outputs, one of said outputs of the said combining circuit being connected to at least one driving input of an associated bistable flip-flop means, the output of said bistable flip-flop means being connected to the output for the associated channel and being cross-connected to the other input of said gate in the combining circuit of the other channel, the output of the high threshold circuit of each channel being connected to the clock input of the associated bistable flip-flop means.

4. A circuit arrangement according to claim 3 wherein each combining circuit in each channel contains a first and a second two input gate, each having one input connected to the low threshold switching circuit output and the other input connected to a source of zero reset pulses, the output of said gate corresponding to the other output of said combining circuit and being connected to a second driving input of an associated flip-flop means in each channel via an inverter.

5. A circuit arrangement according to claim 4 wherein the said first driving input of the flip-flop means in each channel is a setting input and the second driving input of said flip-flop means in each channel is a zero-reset input.

* * * * *

UNITED STATES PATENT AND TRADEMARK OFFICE
CERTIFICATE OF CORRECTION

PATENT NO. : 4,247,760
DATED : January 27, 1981
INVENTOR(S) : MAUSSION, Daniel

It is certified that error appears in the above–identified patent and that said Letters Patent are hereby corrected as shown below:

[73] "Compagnie Internationale pour l'Informatique" should be -- Compagnie Internationale pour l'Informatique Cii-Honeywell Bull (Societe Anonyme) --.

Signed and Sealed this

Twenty-first Day of April 1981

[SEAL]

*Attest:*

RENE D. TEGTMEYER

*Attesting Officer*     *Acting Commissioner of Patents and Trademarks*